Figure 1:
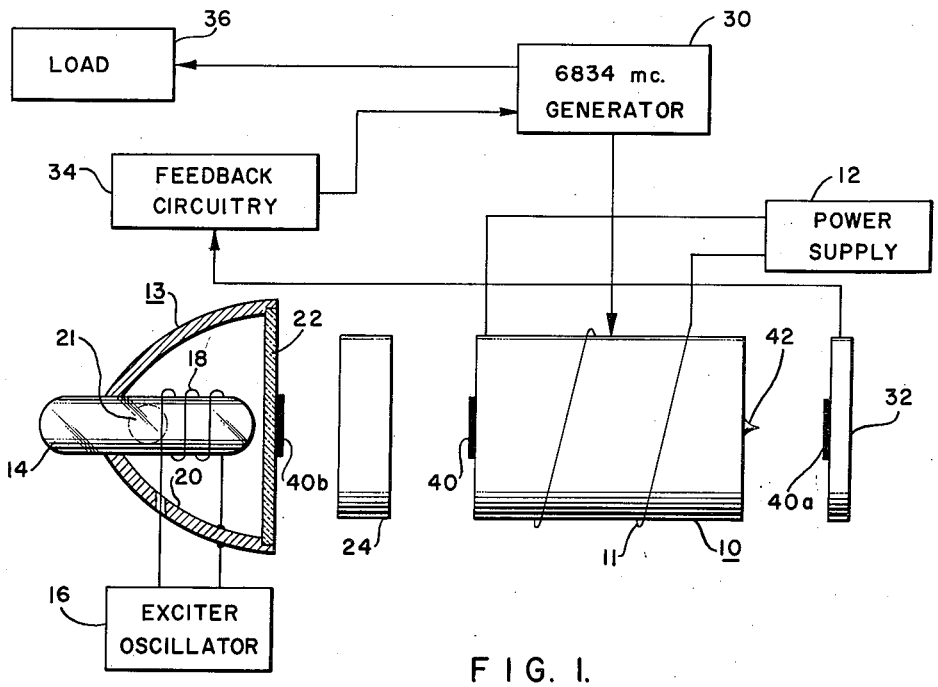

June 5, 1962 P. C. ROBISON 3,038,126
TUNING ARRANGEMENT UTILIZING OPTICAL PUMPING
Filed Nov. 22, 1960

PAUL C. ROBISON
INVENTOR.

BY David P. Ogden

ATTORNEY

United States Patent Office 3,038,126
Patented June 5, 1962

3,038,126
TUNING ARRANGEMENT UTILIZING OPTICAL PUMPING
Paul C. Robison, Pacific Palisades, Calif., assignor to Space Technology Laboratories, Inc., Los Angeles, Calif., a corporation of Delaware
Filed Nov. 22, 1960, Ser. No. 70,985
5 Claims. (Cl. 331—3)

This invention relates to a tuning arrangement and more particularly to an arrangement for increasing the sensitivity to small frequency variations of an optically pumped resonant medium arrangement to develop an extremely precise frequency signal.

For satisfactory operation of certain electronic devices such as atomic clocks, masers, and the like, it is desirable to create an extremely precise signal at a known constant frequency. The accuracy of such a device depends to a large extent upon the obtaining of a minimum interference background noise level compared to a microwave electromagnetic error signal as a function of the hyperfine spectral radiations of the resonant medium being used. One arrangement for deriving a constant frequency signal is the utilization of a resonant medium having a quantum resonance corresponding to a transition between selected quantum energy levels of certain particles of the resonant medium. The utilization of such particles for developing a frequency standard signal is accomplished by optical pumping to induce selectively certain quantum energy level population distributions in a resonant medium, disturbing the population distribution by ultra high frequency electromagnetic energy and detecting light absorptivity of the resonant medium to develop an extremely precise frequency error signal. In this process there is established, at least intermittently, a non-thermal equilibrium population difference between preselected energy levels of the resonant medium. This population difference is induced by impinging an optical pumping light beam, which contains photons having energy in a preselected hyperfine wavelength, upon a resonant medium maintained in a cell which is transparent to the particular wavelength and to a unidirectional magnetic field. A characteristic, such as the intensity of the optical pumping light beam as detected after it traverses the gas cell, is measured to provide signal information. The energy absorbed from the optical pumping light beam, in inducing the population difference, is exhibited by a decrease in intensity. Therefore, the decrease in intensity of the detected optical pumping light beam is dependent upon the degree of population difference that the optical pumping light beam can induce.

The population difference is reducible by applying to the gas cell a predetermined ultra high frequency electromagnetic field. To obtain maximum control requires the maximum absorption of the pumping light energy during resonance conditions of the ultra high frequency electromagnetic energy resulting in a large error signal in response to minimum frequency deviations of the electromagnetic energy signal. Some of the prior art devices exemplify a problem indicating that a central portion of the resonant medium becomes at least partially insensitive to small changes of the preseletced frequency. This insensitivity allows "pumping light noise" to pass through the resonant medium and thus raises the background noise level to effectively reduce the difference between the error signal and the minimum signal obtained when the electromagnetic energy signal is precisely at the hyperfine resonant frequency.

It has been observed that, when using a cylindrical gas cell containing a resonant medium in the center of a resonant cavity which is excited by an electromagnetic field of the $TE_{011}$ mode at a frequency corresponding to the energy difference between the two quantum substate levels of interest, the resonant medium occupying the central portion of the gas cell is somewhat insensitive to small changes of the frequency of the electromagnetic field. As a result, the central portion of a detector coaxial with the magnetic field surrounding the resonant medium will tend to be energized substantially and uniformly during the entire period of operation of the system. This energization of the detector creates a substantial background noise signal which reduces effectively the percent change of any error signal obtainable from the system.

There are two theories supporting the above described phenomena. A first theory is based on the probability that the high frequency electromagnetic energy signal supplied to the gas cell in the $TE_{011}$ mode creates, at the center of the gas cell, an electromagnetic saturation which broadens the effective width of the hyperfine resonance of the resonant medium within the gas cell. As a result, the pumping light energy submitted to the central region is absorbed by the resonant medium despite variations of frequency of the electromagnetic field. A second theory supporting the above described phenomena is that the pumping lamp is of a simple and reliable arrangement which increases the likelihood of concentrated pumping light energy flow along the central region of the gas cell. Because of the energy concentration at the center, the resonant medium is unable to absorb a substantial portion of the light transmitted therethrough.

Accordingly, it is an object of the present invention to improve the sensitivity of an optically pumped resonant medium device by eliminating a major source of the background noise interference.

In one embodiment of the present invention an opaque shielding means is arranged between the pumping light source and the detector at a coaxial location, preventing transmission of pumping light energy to the central region of the detector and thus substantially reducing the background noise energization thereof.

Figure 2:
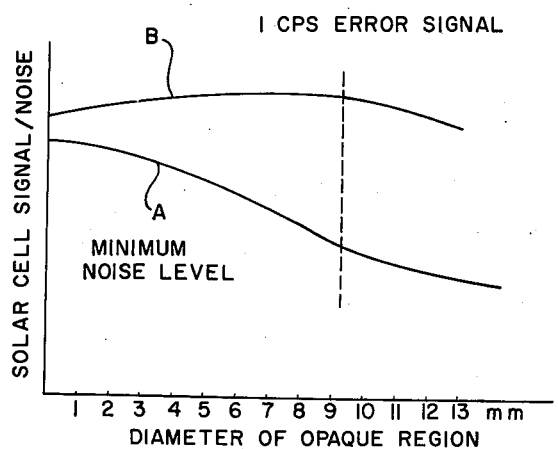

This invention is particularly pointed out and distinctly claimed in the concluding portion of the specification. The invention, however, as to its organization and operation, together with further objects and advantages thereof, will best be understood by reference to the following description taken in connection with the accompanying drawing, in which:

FIG. 1 is a block diagram including a schematic plan view partially in section of a frequency standard utilizing the present invention; and FIG. 2 is a graph illustrating the relationship between the size of the central opaque region, the magnitude of the desired error signal, and the noise level within the radiation detector.

Referring now to the drawing, in FIG. 1 there is shown a gas cell 10 containing a resonant medium such as rubidium 87. The atomic arrangement of rubidium 87 is such that, in the presence of a relatively small unidirectional magnetic field, atoms may be driven selectively from one quantum level substate to another by the application of a certain wavelength of light. The unidirectional magnetic field is generated by a coil 11 receiving a unidirectional current from a power supply 12. The particular light energy absorption bands of certain atoms are known and the absorption of energy in only one of these bands will cause the atoms to occupy selectively a certain quantum energy level substate in a prescribed manner. Thus, a pumping light beam is caused to pass to, and to some extent through, the gas cell 10 from a light source or pumping lamp 13. This pumping lamp 13 is arranged to emit light of at least one particular wavelength which will tend to energize the resonant medium within the gas cell 10 to cause an abnormal population distribution in preselected quantum energy levels.

One arrangement for obtaining the particular light wavelength utilizes a medium similar to that in the gas cell 10 and contained within an evacuated tube 14, and energizes this medium by a high frequency electromagnetic field applied thereto from an exciter oscillator 16 by means of a coil 18 positioned coaxially with one end of the tube 14. The coil 18 has one end coupled to a parabolic reflector 20 to develop a maximum field between the other end of the coil 18 and the reflector 20. Such a maximum field generates an illuminated region 21 within the tube 14 at the focal point of the reflector 20 of the lamp 13 whereby the radiation containing photons of the necessary wavelength is reflected as a collimated light beam toward the gas cell 10. The use of the medium rubidium 85 in the tube 14 results in the selective emission of particular wavelengths of light, including a band of light centered at a wavelength of approximately 7800.23 Angstrom units. Because of the high temperatures involved it is preferred that the tube 14 is enclosed by a quartz lens 22 which will not deteriorate because of the heat and which will readily transmit photons having a wavelength of about 7800.23 Angstrom units. It is preferred that the tube 14 itself be made of Corning type 7052 Pyrex glass because of the apparent absorption of rubidium atoms by quartz glass. A more detailed discussion of the pumping lamp 13 is set forth in the copending application for Letters Patent of the United States, Serial Number 852,266, filed November 12, 1959, by Warren A. Marrison and assigned to the assignee of the present patent application.

When the medium in the tube 14 is rubidium 85 and the resonant medium in the gas cell 10 is rubidium 87, it is preferred to provide an intermediate filter 24 to absorb a major portion of certain of the electromagnetic radiation energy other than that having wavelengths in the band centered at 7800.23 Angstrom units. As a result, the gas cell 10 receives a collimated pumping light beam of a single wavelength band. It has been discovered that the application of such a particular wavelength of light will tend to pump the rubidium 87 in the gas cell 10 into a certain quantum level of the ground state to create an abnormally high population in that level.

The above apparatus operates in a method predicated on certain quantum characteristics achieved with the fine and hyperfine atomic structure of the resonant medium. A more complete understanding of these characteristics will be helpful in understanding the character of the present invention.

The energy levels of interest in practicing one embodiment of this invention are based on the rubidium 87 quantum structure which dictates that an $S_{1/2}$ ground energy state in the presence of a weak magnetic field includes two levels, $F=1$ and $F=2$, and a total of eight magnetic substates; five in the $F=2$ level and three in the $F=1$ level. A first optically excited $P_{1/2}$ state also has a corresponding number of F levels and magnetic substates. A band of light having wavelengths of around 7800.23 Angstrom units will pump selectively the atoms from the $S_{1/2}$ ground state to the $P_{1/2}$ state.

It is recognized that both rubidium 85 and rubidium 87 will absorb photons of a wavelength of about 7800.23 Angstrom units. Moreover, each of these resonant mediums, when energized, will emit photons of a wavelength of about 7800.25 Angstrom units. Thus both of these resonant media have what may be termed a fine line of radiant absorptivity of about 7800.23 Angstrom units. However, both rubidium 85 and rubidium 87 have a doublet hyperfine spectral radiation in this wavelength band with rubidium 87 receptive of two wavelengths spaced about .15 Angstrom units apart and rubidium 85 having a doublet spaced about .07 Angstrom unit apart. Thus, when rubidium 85 is used in the lamp 13 it creates two relatively broad hyperfine radiation wavelengths with one of them being slightly closer to the resonant wavelength absorbable by rubidium 87 than the other. As a result, a greater number of atoms will be pumped from the $F=2$ level of the $S_{1/2}$ ground state than will be pumped from the $F=1$ level of the $S_{1/2}$ ground state. When the optical light beam from a rubidium 85 lamp impinges upon a resonant medium of rubidium 87 atoms in the $S_{1/2}$ energy state, a preponderance of the atoms in the $F=2$ level of the $S_{1/2}$ ground state is temporarily energized and raised to the $P_{1/2}$ first optically excited state. Since the occupancy of the $P_{1/2}$ optically excited state is transient in nature, the atoms will return to the level of the $S_{1/2}$ state, and there is an equal probability that the atoms will occupy positions in the magnetic substates of either the $F=1$ or $F=2$ levels of the $S_{1/2}$ state. Since the atoms are pumped predominantly from the $F=2$ level and drop down into either the $F=1$ or the $F=2$ level, it must be appreciated that there is a depletion of the number of atoms occupying the $F=2$ level of the $S_{1/2}$ state and overpopulation of atoms in the $F=1$ level of the $S_{1/2}$ state. This pumping of the atoms absorbs energy from the particular wavelength of the collimated pumping light beam.

However, it is recognized that the energy separations between the $F=2$ level and the $F=1$ level of the $S_{1/2}$ ground state are resolvable by optical energy or electromagnetic energy of a precise and known frequency. The energy difference between atoms in the $F=1$ level of the $S_{1/2}$ ground state into which they tend to be pumped by the pumping light beam as compared to the $F=2$ level of the $S_{1/2}$ ground state from which they tend to be pumped by the pumping light beam is such that the application of an electromagnetic field of 6834 megacycles to the gas cell 10 in the presence of the weak unidirectional magnetic field will agitate the atoms to pass relatively freely between the two levels $F=1$ and $F=2$ to develop a more equal distribution whereby they may be repumped by the pumping light beam. Thus, during the application of the 6834 megacycle electromagnetic field, the gas cell 10 will continuously absorb the 7800.23 Angstrom unit light energy.

The 6834 megacycle signal applied to the gas cell 10 is derived from a very stable frequency controllable oscillator 30. The application of this particular 6834 megacycle signal to the gas cell 10 may be accomplished by methods well known in the art. The particular method of introducing this 6834 megacycle signal does not form a part of applicant's invention herein. Significant improvement in the operation of a frequency standard in which any one of several methods of introducing the 6834 megacycle signal to the gas cell 10 has been obtained when applicant's invention was utilized. One method of introducing the 6834 megacycle signal is by utilizing a microwave horn as shown in Arditi 2,955,262. Another method is by utilizing a resonant cavity as shown in Dicke 2,940,050. Those skilled in the art may choose either of these or any other suitable method.

If, for example, the 6834 megacycle signal is introduced into the gas cell 10 in the $TE_{011}$ mode it will cause a portion of the atoms to leave the overpopulated $F=1$ level and thus, during resonance of the oscillator 30, reduce to a minimum the energy of the pumping light beam which traverses the gas cell 10 to impinge upon a silicon solar cell detector 32. The energy received by the detector 32 is applied to a feedback circuit 34 including differentiating circuit which develops an error signal to modify the frequency of the oscillator 30. The system may be arranged so that a frequency error as small as one part in $10^{10}$ is detectable; thus an error of one c.p.s. may be detected. The details of the interaction between the oscillator 30, the detector 32, and the feedback circuit 34 are not a portion of the present invention. A more complete discussion of this interaction is set forth in the copending application for Letters Patent of the United States, Serial Number 25,355, filed April 28, 1960 by G. T. Inouye, J. M. Andres, and G. L. Brown, and assigned to the assignee of the present patent application.

During operation of a frequency standard device embodying the above-described components it became apparent that substantial reduction of the background noise (or the minimum detectable signal) would provide a more precise indication of any deviation between the requisite 6834 megacycles signal and the actual output of the oscillator 30. By obtaining a most precise oscillator frequency control, an output signal therefrom when applied to a load 36 allows an improved precision frequency standard arrangement whereby the load 36 may be an improved atomic clock mechanism. However, it was discovered that the central portion of the detector 32 was substantially and uniformly energized during application of the electromagnetic energy to the gas cell 10 despite variations of the frequency of the oscillator 30. Thus, a major portion of the background noise was a result of the insensitivity to changes of frequency of this central portion of the detector 32.

According to the present invention, once the rather complex nature of the problem is appreciated, the elimination of this portion of the background noise within the frequency control arrangement is accomplished by the expedient of substantially eliminating the application of any pumping light beam energy radiation to the central portion of the detector 32. Thus continuous and insensitive energization of the central portion of the detector 32 is prevented.

One arrangement for preventing the undesired energization of the detector 32 is illustrated in FIG. 1 as an opaque central region 40 on the axis of a surface of the gas cell 10 facing the pumping lamp 13. This effectively prevents any light from passing through the atoms of the resonant medium at the central portion of the gas cell 10. As pointed out above, these centrally located atoms are relatively unaffected by slight frequency variations of the 6834 megacycles electromagnetic energy applied to the gas cell 10 in the $TE_{011}$ mode and therefore absorb a constant amount of energy of the collimated light despite slight frequency variations. By eliminating this uncontrolled portion of the light beam, the effective maximum sensitivity of the gas cell 10 is increased whereby the maximum error signal is obtained from the detector 32. Supplementing opaque regions 40a and 40b may be placed on or near the central portion of the surface of the detector 32 or on the center of the lamp 13, respectively. Any or all of these opaque regions will increase substantially the sensitivity of the system without appreciably reducing the error signal.

Subsequently, it has been observed that another advantage results from the utilization of the central opaque region 40. Such a location is compatible with an optimum axial location for closing the vacuum pump line to the gas cell 10 as indicated at the tip 42. With the optical properties of the tip 42 which tend to disperse the transmitted light, it is preferable to place the opaque region between the resonant medium of the gas cell 10 and the illuminated region 21 of the lamp 13. Moreover, the central location of the opaque portion 40 effectively blocks any concentrated pumping lamp radiation which would otherwise tend to flow directly from the illuminated region 21 along the axial portion of the gas cell 10.

Referring now to FIG. 2 there is shown a background noise level curve (A) illustrating the relationship of the size of the central opaque region 40 to the signal level within the detector 32 compared to an error signal of a one cycle error curve (B) in the 6834 megacycles oscillator. The axis of the ordinates represents the solar cell detector current and the axis of the abscissa represents the diameter of the opaque portion in millimeters.

The particular device to which FIG. 2 pertains includes a tube 14 having a diameter of about seven millimeters with the gas cell 10 having a length of about 1½ inches and a diameter of 31 millimeters. The tube 14 contains one to two milligrams of rubidium 85 and a buffer gas of argon at a pressure of five millimeters mercury. The gas cell 10 contains several milligrams of rubidium (including 27.7% rubidium 85 and 72.3% rubidium 87) with a buffer gas of 53.6% neon and 46.4% argon at a pressure of ten millimeters mercury. In this particular arrangement, the opaque region 40 of a diameter of approximately nine millimeters will block a major portion of the background noise signal curve A. As indicated by the curves A and B of FIG. 2, the noise to error signal ratio is improved substantially by the use of an opaque region of nine millimeters.

I claim:

1. In combination with a resonant medium gas cell receptive of a collimated light beam tending to pump atoms from one quantum level to another, and receptive of R.F. electromagnetic radiation tending to enhance transition from the another quantum energy level to the one at a particular frequency resonance, and a detector receptive of the collimated light traversing the gas cell; means for increasing the sensitivity of the detector to resonance of the R.F. electromagnetic radiation, comprising: an opaque region centrally positioned within the collimated light beam to block a small portion thereof, which portion tends to traverse the gas cell irrespective of the optimum tuning of the R.F. electromagnetic radiation.

2. In combination with a resonant medium gas cell receptive of a collimated light beam of a particular wavelength tending to pump atoms from one quantum level to another, and receptive of R.F. electromagnetic radiation tending to enhance transition from the another quantum energy level to the one at a particular frequency resonance with the electromagnetic radiation being concentrated along the central portion of the gas cell, and a detector receptive of the collimated light traversing the gas cell, means for increasing the sensitivity of the detector to resonance of the R.F. electromagnetic radiation, comprising: an opaque region positioned within the collimated light beam to block a small central portion thereof, which central portion tends to traverse the gas cell irrespective of the optimum tuning of the R.F. electromagnetic radiation.

3. In combination with a resonant medium gas cell receptive of a collimated light beam of a particular wavelength tending to pump atoms from one quantum level to another with the light energy being concentrated at the center of the gas cell, and receptive of R.F. electromagnetic radiation tending to enhance transition from the another quantum energy level to the one at a particular frequency resonance with the electromagnetic radiation being concentrated along the central portion of the gas cell, and a detector receptive of the collimated light traversing the gas cell, means for increasing the sensitivity of the detector to resonance of the R.F. electromagnetic radiation, comprising: an opaque region positioned within the collimated light beam to block a central portion thereof, which central portion tends to traverse the gas cell irrespective of the optimum tuning of the R.F. electromagnetic radiation, the area of the central portion being at least about five percent of the area of the gas cell and being larger than the area of concentration of the light energy.

4. In combination, a gas cell containing a resonant medium, said gas cell being transparent to a particular wavelength of light; means for generating a collimated light beam of the particular wavelength tending to pump atoms of the resonant medium from one quantum level to another; means coupled to said gas cell for generating ultra high frequency electromagnetic radiation tending to enhance transition from the another quantum energy level to the one at a particular frequency resonance, and being coupled so that a greater amount of electromagnetic radiation is concentrated at the center of said gas cell; a detector receptive of the collimated light traversing said gas cell; and an opaque region positioned within the collimated light beam to block a small central portion thereof, which portion tends to traverse the center of said gas cell irrespective of the optimum tuning of the electromagnetic radiation means because of the saturation effects of the electromagnetic radiation at the center of said gas cell.

5. In combination, a gas cell containing a resonant medium, said gas cell being within a unidirectional magnetic field and being transparent to a particular wavelength of light; means for directing a collimated light beam of the particular wavelength through said gas cell to pump atoms of the resonance medium from one quantum level to another; microwave generating means coupled to said gas cell for generating ultra high frequency electromagnetic radiation tending to enhance transition of atoms of the resonant medium from the another quantum energy level to the one at a particular frequency resonance, and being coupled so that a relatively greater amount of electromagnetic radiation is concentrated at the center of said gas cell; a radiation detector arranged to receive all of the collimated light beam traversing said gas cell; and an opaque region positioned within the collimated light beam to block a small central portion thereof, which portion tends to traverse the center of said gas cell irrespective of the optimum tuning of the electromagnetic radiation means because of the saturation effects of the concentrated electromagnetic radiation at the center of said gas cell.

No references cited.

UNITED STATES PATENT OFFICE

CERTIFICATE OF CORRECTION

Patent No. 3,038,126                                  June 5, 1962

Paul C. Robison

It is hereby certified that error appears in the above numbered patent requiring correction and that the said Letters Patent should read as corrected below.

Column 4, line 11, for "$F_{1/2}$" read -- $P_{1/2}$ --.

Signed and sealed this 22nd day of January 1963.

(SEAL)
Attest:

ERNEST W. SWIDER
Attesting Officer

DAVID L. LADD
Commissioner of Patents